July 6, 1948.

G. W. FYLER 2,444,770

HEIGHT COMPUTING APPARATUS

Filed June 28, 1943

3 Sheets-Sheet 1

Inventor:
George W. Fyler,
by Harry E. Dunham
His Attorney.

July 6, 1948.          G. W. FYLER          2,444,770
HEIGHT COMPUTING APPARATUS
Filed June 28, 1943                    3 Sheets-Sheet 2
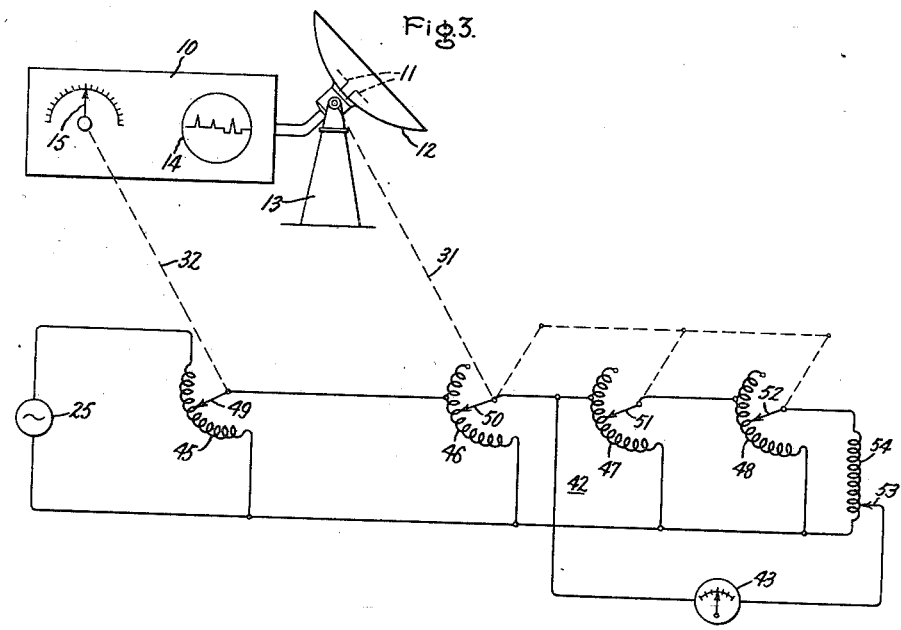
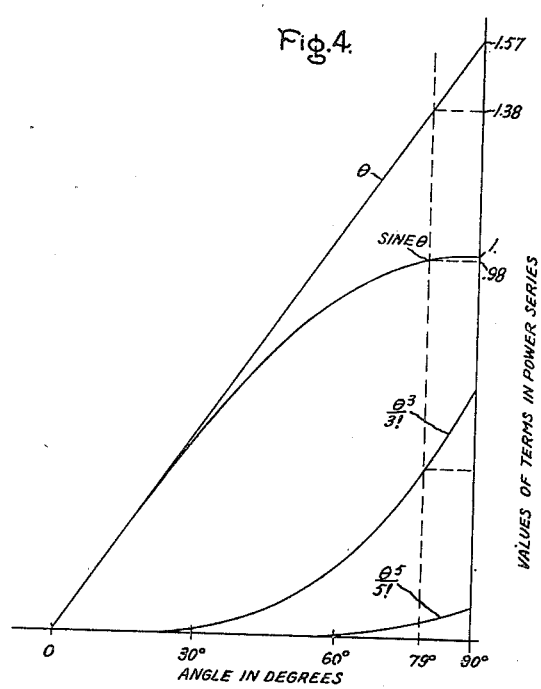
Inventor:
George W. Fyler,
by Harry E. Dunham
His Attorney.

July 6, 1948.  G. W. FYLER  2,444,770
HEIGHT COMPUTING APPARATUS
Filed June 28, 1943   3 Sheets-Sheet 3

Inventor:
George W. Fyler,
by Harry E. Dunham
His Attorney.

Patented July 6, 1948

2,444,770

UNITED STATES PATENT OFFICE 2,444,770

HEIGHT COMPUTING APPARATUS

George W. Fyler, Stratford, Conn., assignor to General Electric Company, a corporation of New York Application June 28, 1943, Serial No. 492,499

11 Claims. (Cl. 235—61)

My invention relates to apparatus for computing values involving the sines of angles and particularly to such apparatus for use in connection with range finding devices to calculate and indicate directly the height of a distant object.

Radio apparatus for finding the direction and range of distant objects commonly includes devices indicating the range and angle of elevation from which the altitude of the distant object may be computed. Various computing devices have been employed in connection with radio locators to indicate the altitude of the located object. Mechanical computers for this process are generally complicated and expensive and it is desirable to provide a simple and rugged form of apparatus which will secure a direct reading within a predetermined degree of accuracy. Electrical computing apparatus for providing values dependent upon a sine function has generally required an electrical circuit component having a characteristic varying in accordance with the sine function. These sine varying components are obviously somewhat complicated to construct. Accordingly, it is an object of my invention to provide an improved electrical apparatus for computing the altitude of a distant object dependent upon range and angle of elevation and which includes linear electrical circuit components.

It is another object of my invention to provide an improved apparatus for computing the height of distant objects which employs alternating current transformers having substantially linear characteristics.

Another object of my invention is to provide a computing device suitable for calculating the altitude of distant objects and which includes linear electrical circuit components arranged to provide a sum of voltages approximating the power series for a sine function.

Figure 1:
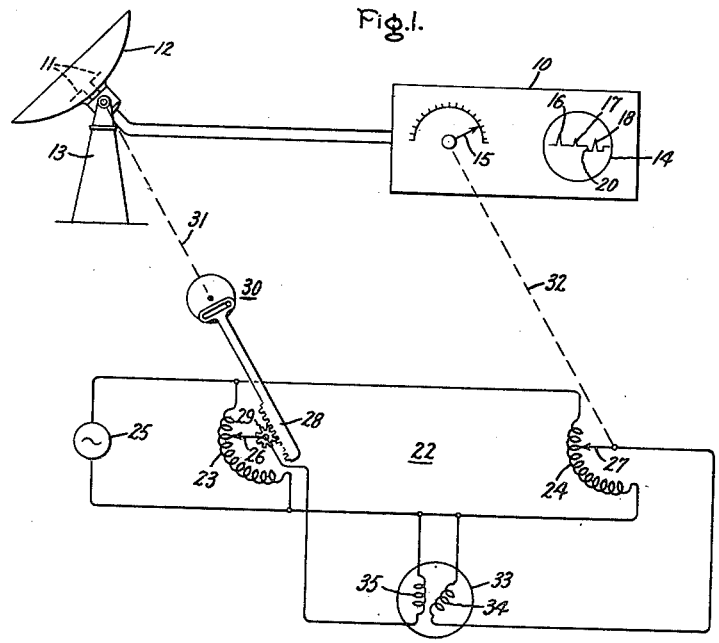
Figure 2:
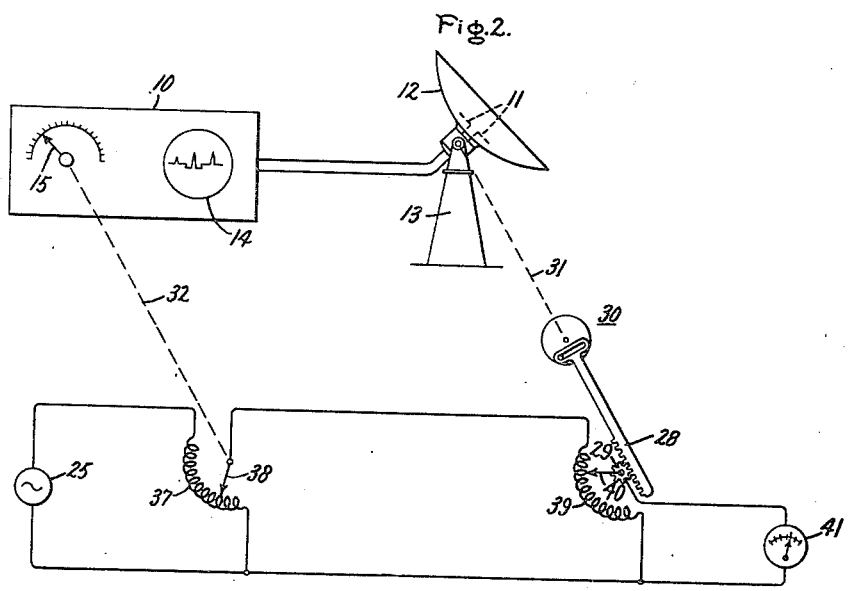
Figure 5:
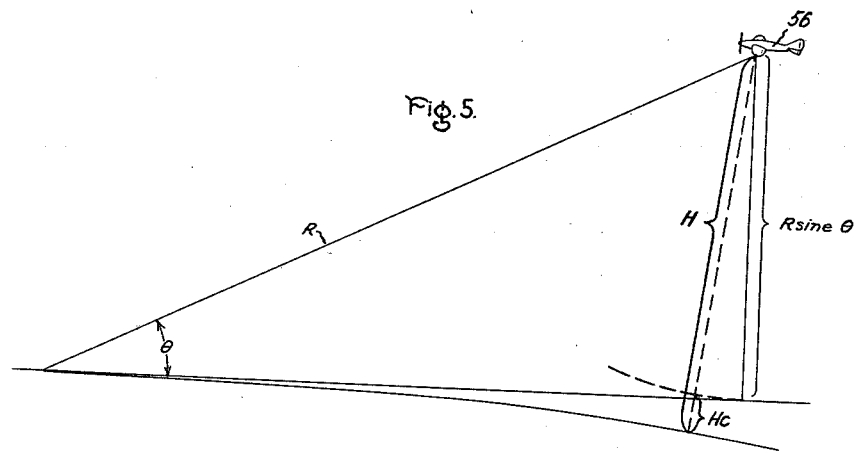
Figure 6:
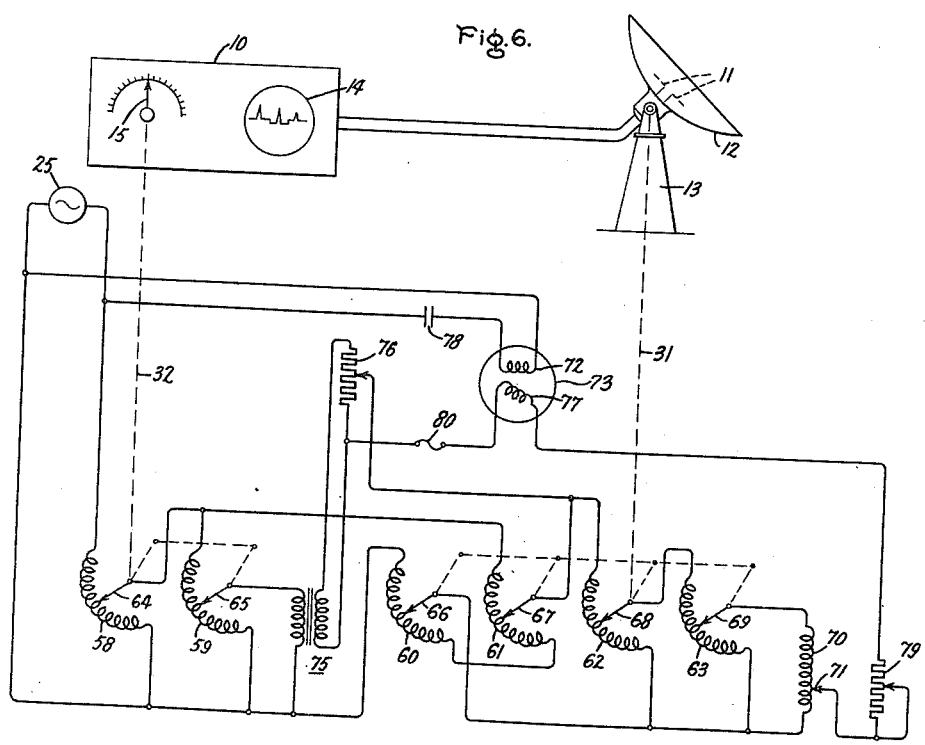

The features of my invention which I believe to be novel are set forth with particularity in the appended claims. My invention itself, however, both as to its organization and method of operation together with further objects and advantages thereof may best be understood by reference to the following description taken in connection with the accompanying drawings in which Figs. 1, 2 and 3 represent different embodiments of my invention employed with radio locating apparatus; Figs. 4 and 5 represent curves or graphs for analyzing the operating characteristics of the device embodying my invention; and Fig. 6 represents still another embodiment.

Briefly, one form of my invention as illustrated in the drawings comprises two autotransformers connected across a constant voltage source of alternating current. The secondary circuit of one of the transformers is varied in accordance with the sine of the angle of elevation of the distant object as determined by a radio locator and the secondary circuit of the other transformer is varied in accordance with the range of the distant object as determined by the locator. In this manner secondary voltages are provided which are proportional to the sine of the angle of elevation and to the range. An electrical instrument is connected to the secondary circuits of the transformers in such a manner as to provide a reading proportional to the product of the sine of the angle and the range. This meter may then be calibrated in terms of the height of the object. In another form of my invention a plurality of autotransformers are connected in cascade across a constant voltage source of alternating current. The secondary voltage of the first transformer is varied in accordance with the range of the distant object, and the secondary voltages of a plurality of the remaining transformers are varied directly in accordance with the angles of elevation of the object. These latter transformers connected in cascade provide one voltage proportional to the product of the angle by the range and another voltage proportional to the product of the third power of the angle by the range. From the first of these voltages is subtracted a predetermined portion of the second voltage. This portion is selected so that the combined voltages approximate the power series for the sine function so that a voltage is available which is proportional to the product of the range and the sine of the angle of elevation. An indicating instrument responsive to this voltage may then be calibrated to indicate directly the altitude of the object. A correction for the additional altitude due to the curvature of the earth may be introduced in the meter circuit to provide a more correct indication of the altitudes of objects at greater distances.

Referring now to the drawing, the range finding and height computing apparatus shown in Fig. 1 comprises a radio locator 10 including a dipole antenna 11 associated with a parabolic reflector 12 pivotally mounted on a pedestal 13. The locator 10 is provided with a cathode ray tube or electron discharge device 14 having a fluorescent screen on which light traces appear indicating objects in the path toward which the reflector 12 is directed. An operating and indicating arm 15 is either manually or automatically positioned in accordance with the range of the distant object as indicated by the light traces on the screen of the cathode ray tube. When the reflector 12 is pointed directly at a distant object the angle of elevation of the object is indicated by the angle between the central axis of the reflector and the horizontal. High frequency pulses reflected from or transmitted by distant objects and impressed on the antenna 11 produce corresponding pulses or peaks on the light trace of the cathode ray tube as indicated at 16, 17 and 18, for example. By moving the range arm 15 an aperture pulse 20, which appears as a ditch in the light trace, is moved along the line of the light trace on the screen of the tube 14. When the aperture pulse is centered with respect to one of the pulses 16, 17 and 18, the arm 15 indicates the range of the distant object from which that pulse has been received. In the drawing, the pulse 18 has been indicated as centered with respect to the aperture pulse 20. The scale for the pointer 15 may be calibrated to indicate directly in miles the range of the distant object.

The height of a distant object, neglecting the curvature of the earth, is equal to the product of its range and the sine of its angle of elevation. The term "range" as employed in this specification designates the line of sight distance to the object which is sometimes called the "slant range." For great distances, it may be necessary to include the correction required because of the curvature of the earth; this correction which varies with the second power of the range is added to the altitude of the object as determined by the product of the range and sine of the angle of elevation. In order to compute the height or altitude of the distance object and to provide a direct reading which is available simultaneously with the readings of the range and angle of elevation, I provide a calculating device 22. The device 22 includes two autotransformers 23 and 24 constituting voltage dividers and connected in parallel across a suitable constant voltage source of alternating current indicated at 25. Transformers 23 and 24 are provided with variable secondary circuits, the number of turns in the secondary circuits being determined by the position of the contact arms 26 and 27, respectively. The contact arm 26 is moved by means of a rack 28 and pinion 29 through a Scotch yoke connection 30 having its crank rotated in accordance with the angle of elevation as determined by the reflector 12 through a suitable connection 31 indicated by a dotted line. The characteristic of the Scotch yoke connection is that when the rotating member including the crank is moved through a predetermined angle the reciprocating member, that is, the rack 28 of the drawing, is moved in accordance with the since of the angle. This mechanism is, therefore, a mechanical means for converting angular movement to simple harmonic motion or sinusoidal movement. The secondary voltage of the transformer 23 is, therefore, varied in accordance with the sine of the angle of elevation. The secondary voltage of the transformer 24 is varied in accordance with the range of the distant object, the contact arm 27 being connected to the operating arm 15 of the device 10 through a suitable mechanism 32 as indicated by a dotted line. In order to obtain an indication proportional to the product of the secondary voltages of the two transformers an electrical instrument 33 is provided. This instrument is of the electrodynamometer type and includes two separate coils 34 and 35, one of the coils being stationary and the other movable. Instruments of this type are constructed and arranged so that the relative movement between the coils provides an indication of the product of the electrical quantities energizing the respective coils. The coils 34 and 35 have been indicated as connected across the secondaries of the transformers 23 and 24, respectively. Since the indication of the instrument 33 is proportional to the product of the range by the sine of the angle of elevation, the scale of the instrument may be calibrated in terms of the altitude of the distant object. For example, it may be calibrated to indicate the altitude of the object directly in feet.

During the operation of the range and altitude finding apparatus shown in Fig. 1, the reflector 12 is moved in the desired direction until a maximum signal is received from a desired object as indicated by the corresponding pulse appearing on the screen of the cathode ray tube 14; obviously, auxiliary apparatus (not shown) is normally employed to facilitate precise pointing of the antenna. The angular position of the reflector 12 then indicates the angle of elevation of the object and the arm 26 of the transformer 23 is moved by the rack 28 to a position providing a secondary voltage corresponding to the sine of the angle of elevation. The operating arm 15 of the locator 10 is then moved until the aperture pulse 20 is centered about the pulse representing the object in question and the pointer 15 then indicates the range of the object in miles. At the same time the secondary voltages of the transformers 23 and 24 are impressed on the coils 34 and 35 of the instrument 33 and the instrument indicates directly the height of the selected distant object. When the apparatus 10 is operated to follow automatically the changes in position of the distant object, the instrument 33 provides a continuous indication of the altitude of the object.

The apparatus illustrated in Fig. 2 is similar to that shown in Fig. 1. However, a different arrangement for connecting the indicating instrument to the transformers is employed; corresponding parts have been designated by the same numerals. In the apparatus of Fig. 2 an autotransformer 37 is connected across the constant voltage alternating current supply 25 and is provided with a rotatable contact arm 38 which is operated in accordance with the range, it being connected to the range determining arm 15 through the coupling means 32. The position of the arm 38 thus determines the transformation ratio of the transformer 37 directly in accordance with the range of the distant object. A second transformer 39 is connected across the secondary circuit of the transformer 37 so that the two transformers are in cascade and a voltage proportional to the range of the object is impressed on the primary winding of the transformer 39. The transformer 39 is provided with a contact arm 40 which is moved in accordance with the sine of the angle of elevation by operation of the rack 28 and Scotch yoke mechanism 30. Since the sine of 90° is equal to 1 and the sines of all other angles are less than 1, the full voltage of the transformer 39 may be made to represent unity and the fractional portions of the transformer winding included in the secondary circuit thus represent the sines of angles less than 90°, and since the voltage across the winding 39 is proportional to range, the fractional voltage across the secondary of the transformer 39 is proportional to the product of the range and the sine of the angle of elevation. In order to provide a direct indication of the altitude of the distant object a suitable indicating instrument such as a voltmeter 41, may be connected across the secondary of the transformer 39. This instrument may be calibrated directly in feet of altitude. The device of Fig. 2 thus provides a direct indication of the altitude of the distant object which is available simultaneously with the indication of range and angle of elevation.

In Fig. 3 I have illustrated a range finding device including a calculating apparatus which employs linear electric circuit components and eliminates the necessity of employing a mechanical converting arrangement for obtaining voltages proportional to the sines of angles. The range and angle finding apparatus of Fig. 3 are similar to that of Fig. 1 and corresponding parts have been designated by the same numerals. In order to provide a direct reading of the altitude of the distant object, a computing apparatus 42 is provided which includes a direct reading or indicating instrument 43.

The calculating apparatus 42 has been illustrated as including four autotransformers 45, 46, 47 and 48, respectively, connected in cascade across the constant voltage alternating current supply 25. The transformer 45 is connected directly across the source 25 and its variable secondary circuit is controlled by a contact arm 49 rotated by the coupling device 32 directly in accordance with the range as determined by the arm 15. The autotransformers 46, 47 and 48 are provided with movable contact arms 50, 51 and 52, respectively, which are ganged, or mechanically coupled, to rotate together and are driven directly by the coupling 31 so that their positions are directly dependent upon the angle of elevation. The transformers 46, 47 and 48 are connected so that they provide voltages which correspond to terms of the power series for the sine function and which may be added to provide a voltage proportional to the sine of the angle of elevation. Furthermore, since this voltage is also proportional to the range as determined by the operation of the transformer 45, the final voltage is proportional to the product of the range and the sine of the angle of elevation.

The power series for determining the sine function of an angle when the angle is expressed in radians is given by the following equation:

$$\text{Sine } \theta = \theta - \frac{\theta^3}{3!} + \frac{\theta^5}{5!} - \frac{\theta^7}{7!} + \ldots$$

In Fig. 4 are plotted curves representing the sine of an angle and the first three terms of the above series for angles from 0 to 90° or $$\frac{\pi}{2}$$

radians. From these curves it is evident that the sine curve may be approximated by subtracting from the straight line representing the angle in radians the value of the cubic curve and by adding the value of the fifth power curve all for a given value of the angle. The first two terms of the power series provide a reasonably good approximation for the sines of angles up to about 60°. In order to provide voltages which can be added to approximate the value of the sine of the angle of elevation the transformers 46, 47 and 48 are connected so that the transformer 46 provides a secondary voltage proportional to the angle of elevation, the transformer 47 provides a secondary voltage proportional to the square of the angle of elevation and the transformer 48 provides a secondary voltage proportional to the cube of the angle of elevation. Since the voltage impressed on the transformer 46 is proportional to the range as determined by the position of the contact arm 49 of the transformer 45, the secondary voltages of the several transformers 46, 47 and 48 are therefore proportional to the product of the range and the first, second and third power, respectively, of the angle of elevation. The indicating instrument 43 is connected between the contact arm 50 and a contact arm 53 of an autotransformer 54, the primary of which is connected across the output of the transformer 48. It will be evident that the instrument 43 is responsive to a voltage equal to the difference between the secondary voltage of the transformer 46 and the secondary voltage of the transformer 54. The primary voltage of the transformer 54 is proportional to the product of the range and the third power of the angle of elevation, and the secondary voltage is a fixed proportion of the primary voltage which is selected to provide the correct value for the second term of the power series and also a correction for the omission of all the terms of the series above the third power term. I have found that by substituting the value of 6.1 for 3! or 6.0 in the power series, values of the sine of an angle of elevation which are accurate within one per cent of error up to an angle of elevation of 70° may be obtained. The secondary of the transformer 54 is, therefore, made to provide a voltage equal to $$\frac{1}{6.1}$$

of the primary voltage. In order that the apparatus may be employed for obtaining altitude when the angle of elevation is either greater than or less than one radian, the input voltages of the transformers 46, 47 and 48 are impressed across a portion of the primary winding representing one radian, the arms 50, 51 and 52 swinging above these points when the angle of elevation is greater than one radian. The transformers, therefore, operate as step-up or step-down transformers, it being obvious that when the contact arms 50, 51 and 52 are directly opposite the primary connection representing one radian then the first, second and third powers of the angle are all equal to unity. The instrument 43 may then be calibrated with the value of voltage at one radian considered as unity and voltages below as fractional values.

The circuit of Fig. 3 provides a simple and effective computer which includes only linearly varying circuit components and avoids the necessity of providing mechanical means for converting the rotation proportional to the angle to rotation proportional to the sine of the angle.

Under some conditions of operation and particularly when the range finding apparatus is employed for measuring the ranges of objects at great distances, a correction to account for the earth's curvature must be added to the calculated altitude to obtain the true altitude. The diagram of Fig. 5 illustrates the geometry by which the altitude of the distant object is determined. In Fig. 5 a distant object such as an airplane is indicated at 56, at an angle of elevation indicated at $\theta$ and at a distance from the range finding apparatus indicated as R, the calculated altitude of the plane is R sine $\theta$ as indicated. The true height is of course measured along a perpendicular H from airplane 56 to the earth's surface and the added altitude to correct for the curvature of the earth is the difference between H and R sine $\theta$, indicated as $H_c$. When the range R is determined in nautical miles the altitude in feet may be found by the following equation:

Height in feet = 6000 $R$ sine $\theta$ + .865 $R^2$ $\theta$ being the value of the true angle of elevation in radians.

The computing apparatus shown in Fig. 6 provides an earth curvature correction. This apparatus is operated by a radio direction and range finding device similar to that shown in Figs. 1, 2 and 3 and corresponding parts have been designated by the same numerals. The height computer shown in Fig. 6 comprises a plurality of autotransformers 58, 59, 60, 61, 62 and 63. The transformers 58, 59 are provided with contact arms 64, 65, respectively, which are mechanically coupled to be rotated simultaneously in accordance with the range through operation of the coupling device 32. The remaining transformers 60, 61, 62 and 63 are the sine function components and are provided with contact arms 66, 67, 68 and 69, respectively, which are ganged together so that they are moved simultaneously in accordance with the angle of elevation, the arms being rotated by the coupling device 31 in accordance wtih the angle of elevation as determined by the antenna 11. The transformer 58 is similar to the transformer 45 of Fig. 3 and is connected across the constant voltage alternating current source 25 in the same manner. The transformers 60, 61 are connected together in series so that they provide in effect, a single transformer having double the number of turns and, since the arms 66 and 67 both vary in accordance with the angle of elevation, the effective secondary circuit of the transformers 60 and 61 in series varies with respect to the entire primary circuit in proportion to the angle of elevation. The two transformers in series provide an output voltage more accurately proportional to the angle of elevation than if only one transformer were used. The transformers 60 and 61 in series are connected in cascade with the output of the transformer 58 and the transformers 62 and 63 are connected in cascade with the common series output of the transformers 60 and 61. These four transformers operate in a manner similar to the three transformers 46, 47 and 48 of Fig. 3 to provide voltages proportional to the product of the range and the first, second and third powers, respectively, of the angle of elevation. The arrangement of the sine function transformers 60, 61, 62 and 63 differs from that of the transformers 46, 47 and 48 in Fig. 3 in that the entire primary winding of each of the transformers is connected across the output of the preceding transformer and the used portion of the output voltage of transformer 63 is different from that of the transformer 48 for reasons which will be pointed out below. The output of the transformer 63 is connected in the primary circuit of an autotransformer 70 having a tap 71 for providing the desired proportion of the output voltage representing the product of the range by the third power of the angle. The ratio of primary to secondary turns of the transformer 70 is $$\frac{1}{6.1}$$

only when the unity voltage corresponds to an angle of one radian, in other words, when the contact arms of the transformers 60, 61, 62, and 63 are at their top positions in Fig. 6 when the angle of elevation is one radian. If the unity voltage of the transformers 60, 61, 62 and 63 corresponds to an angle greater than one radian, then a ratio of the transformer 70 must be selected which takes into account this difference between the position of the control arms for unity voltage and their position for unity angle or one radian.

For purposes of illustration let it be assumed that the maximum angle of elevation is 79°, that is, 1.38 radians, approximately. The sine of this angle is .98, approximately, as shown in Fig. 4. Now if the voltage corresponding to an angle of 1.38 radians at the full or maximum rotation of the contact arm is considered as unity, then the voltage corresponding to the sine of the angle must be equal to .98 divided by 1.38 or .71 times the unity or full rotation voltage. The difference between the sine voltage and the unity is, therefore, .29 times the unity voltage, which is equal to unity voltage divided by 3.45. At full rotation the secondary voltage of the transformer 63 is unity voltage; therefore, $$\frac{1}{3.45}$$

is the desired factor and the transformer 70 is arranged with its output tap 71 connected to provide a voltage which is $$\frac{1}{3.45}$$

times the output voltage of the transformer 63. This ratio then provides a satisfactory approximation of the second term of the power series for all angles up to 79° when the full rotation of the control arm corresponds to 79°.

The difference between the voltage of the output of the transformers 60 and 61 in series and the output voltage of the transformer 70 provides a voltage which is approximately proportional to the product of the range and the sine of the angle of elevation for all angles up to 79° and an indicating instrument 73 having a moving coil 77 connected to be responsive to this voltage may be calibrated in terms of the height of a distant object.

In order to provide a more accurate indication of the altitude of objects at great distances from the range finding apparatus the output of the transformer 59 is connected across the primary of a transformer 75. Since the transformer 59 is in cascade with the transformer 58, its output voltage is proportional to the square of the range. The secondary of the transformer 75 is designed to provide a small fraction of the voltage at the secondary of the transformer 59. The secondary of the transformer 75 is connected across an adjustable potentiometer 76 in the circuit of the instrument 73 so that the required voltage is introduced in the circuit of the instrument which voltage is proportional ot the earth's curvature correction required at any particular range. The potentiometer 76 is connected in the circuit of the moving coil 77 of instrument 73 so that the voltage across the selected portion of the potentiometer is added to the voltage across the output of the transformers 60 and 61 in series. The instrument 73 has been indicated as of the wattmeter type which includes the moving coil 77 and a stationary coil 72, the coil 77 being connected in the circuit just described and the other coil 72 being connected directly across the constant voltage source 25 through a condenser 78. This connection provides an alternating current voltmeter having a substantially linear scale. A resistance 79 is provided in series with the coil 77 in order to calibrate the meter in accordance with the voltage of the source 25. A fuse or other suitable overcurrent protective device 80 may be provided in the circuit of the meter to protect the meter against overloads which might be caused, for example, by simultaneous adjustment for maximum range and maximum angle of elevation.

During the operation of the apparatus shown in Fig. 6 the meter 73 may be calibrated to indicate the altitude of a distant object directly in feet and simultaneously with the indication of range by the pointer 15 and the angle of elevation by the setting of the reflector 12. The transformers 59 and 75 provide a correction for change in measured altitude due to the curvature of the earth and the apparatus is, therefore, suitable for the computing of the altitude of objects at great distances from the range finding apparatus.

From the foregoing it is readily apparent that I have provided apparatus for computing the altitude of distant objects by electrical means and which requires only linear electric circuit components. This apparatus is of rugged construction and is simple and effective in operation. It provides a direct reading of altitude which is available simultaneously with the reading of range and angle of elevation and which is accurate within a predetermined desired degree.

Although I have shown particular embodiments of my invention in connection with radio direction and range finding apparatus, other modifications will readily occur to those skilled in the art. It will, therefore, be understood that I do not wish my invention to be limited to the particular arrangements shown and described, and I intend by the appended claims to cover all modifications which fall within the spirit and scope of my invention.

What I claim as new and desire to secure by Letters Patent of the United States is:

1. In a system for determining the altitude of a distant object, the combination of one member movable in accordance with the range of the object and another member movable in accordance with the angle of elevation of the object, means dependent upon the position of said one member for producing a quantity corresponding to the range of the object, means dependent upon the position of said other member for producing a plurality of quantities corresponding to a plurality of the terms of the power series for the sine of the angle of elevation, and means for combining said quantities to produce a quantity proportional to the product of the range and the sine of the angle of elevation.

2. In a system for determining the altitude of a distant object, the combination of one member movable in accordance with the range of the object and another member movable in accordance with the angle of elevation of the object, means dependent upon the position of said one member for producing a quantity corresponding to the range of the object, means dependent upon the position of said other element and utilizing said quantity for producing a plurality of quantities corresponding respectively to the product of the range and each of a plurality of the terms of the power series for the sine of the angle of elevation, and means for adding said product quantities to provide a quantity proportional to the product of the range and the sine of the angle of elevation.

3. In a system for determining the altitude of a distant object, the combination of one member movable in accordance with the range of the object and another member movable in accordance with the angle of elevation of the object, means including a linear voltage dividing element and dependent upon the position of said one member for producing a voltage proportional to the range of the object, means including a plurality of linear voltage dividing elements and dependent upon the position of said other member for producing a plurality of voltages corresponding respectively to each of a plurality of the terms of the power series for the sine of the angle of elevation, and means for multiplying said plurality of voltages by said range voltage and for adding the product voltages to provide a voltage proportional to the product of the range and the sine of the angle of elevation.

4. In a system for determining the altitude of a distant object, the combination of one member movable in accordance with the range of the object and another member movable in accordance with the angle of elevation of the object, means dependent upon the position of said one member for providing a voltage corresponding to the range of the object, means dependent upon the position of said other member for providing a voltage proportional to the sine of the angle of elevation of the object, means for combining said voltages to produce a voltage proportional to the product of the range and the sine of the angle of elevation, means for adding to said product voltage a correction to account for the curvature of the earth whereby the corrected product voltage is substantially proportional to the vertical elevation of the object above the surface of the earth, and means responsive to the corrected product voltage for indicating directly the altitude of the distant object.

5. In a system for determining the altitude of a distant object, the combination of one member movable in accordance with the range of the object and another member movable in accordance with the angle of elevation of the object, means dependent upon the position of said one member for providing a voltage corresponding to the range of the object, means responsive to said range voltage and dependent upon the position of said other member for producing a voltage proportional to the product of the range and the sine of the angle of elevation of the object, means responsive to said range voltage, for producing a voltage proportional to the square of the range, means for adding a predetermined fraction of said last-mentioned voltage to said product voltage to correct it to account for the curvature of the earth, and means responsive to the corrected product voltage for indicating directly the altitude of the distant object.

6. In a system for determining the altitude of a distant object, the combination of one member movable in accordance with the range of the object and another member movable in accordance with the angle of elevation of the object, means including first and second linear voltage dividing elements and dependent upon the position of said one member for producing voltages proportional to the range of the object and to the second power of the range, respectively, means including a plurality of linear voltage dividing elements and dependent upon the position of said other member for producing a plurality of voltages corresponding respectively to each of a plurality of the terms of the power series for the sine of the angle of elevation, means for multiplying said plurality of voltages by said range voltage and for adding said product voltages to provide a voltage proportional to the product of the range and the sine of the angle of elevation, and means utilizing said voltage proportional to the second power of the range for adding to said range-sine product voltage a correction to account for the curvature of the earth.

7. An apparatus for computing the altitude of a distant object comprising a first movable member arranged to be positioned in accordance with the distance to said object, a second movable member arranged to be positioned in accordance with the angle of elevation of said object, means including a variable voltage divider having a linear characteristic and associated with said first member for producing a voltage proportional to said distance, means including a plurality of variable linear voltage dividers connected in cascade with the output of said first divider and associated with said second member for producing a voltage proportional to the sine of said angle of elevation, said last mentioned means including means for varying the voltage ratios of said plurality of dividers simultaneously in proportion to the angle of elevation of said object whereby one of said plurality of dividers provides a voltage proportional to the angle of elevation of said object and another of said plurality of dividers produces a voltage proportional to the third power of the angle of elevation of said object, and means including an indicating instrument for connecting said plurality of voltage dividers to provide a voltage proportional to the product of the range and the sine of said angle of elevation.

8. An apparatus for computing the height of a distant object comprising a source of alternating current, a plurality of transformers having adjustable outputs, one of said transformers being connected across said source and the remaining ones of said transformers being connected in cascade with said one transformer, means for varying the output voltage of said one transformer in accordance with the range of said object, means for varying the output voltages of a plurality of said remaining transformers in accordance with the angle of elevation of said object to produce voltages proportional to the product of said range and the first and third powers respectively of said angle, and means arranged to combine the two last mentioned voltages for producing a voltage proportional to the product of said range and the sine of said angle.

9. An apparatus for computing the altitude of a distant object comprising a constant voltage alternating current source, a plurality of transformers having adjustable outputs, the first of said transformers having its input connected across said source, means for varying the output voltage of said first transformer in proportion to the distance to said object, means connecting three of the remaining ones of said transformers across the output of said first transformer in cascade, means for simultaneously varying the outputs of said three transformers in proportion to the angle of elevation of said object whereby the outputs of said three transformers are proportional respectively to the product of the distance to said object and the first, second and third powers respectively of said angle, and means including an electrical instrument connected to be responsive to the difference between the output voltage of said transformer proportional to the first power of said angle and a predetermined fraction of the output voltage of said transformer proportional to the third power of said angle, said predetermined portion being selected so that said instrument is proportional to the product of the distance to said object and the sine of said angle.

10. An apparatus for computing the altitude of a distant object comprising a constant voltage alternating current source, a plurality of transformers having adjustable outputs, the first of said transformers having its input connected across said source, the second, third and fourth ones of said transformers being connected in cascade with said first transformer, means for varying the output voltage of said first transformer in proportion to the distance to said object, means for varying the output voltages of said second, third and fourth transformers in proportion to the angle of elevation of said object whereby the output voltage of said second transformer is proportional to the product of said angle and said distance and the output voltage of said fourth transformer is proportional to the product of the cube of said angle and said distance, means connected to the output of said fourth transformer for providing a voltage proportional to a constant fraction of the output voltage of said fourth transformer, and means including an instrument connected to be responsive to the difference between the output voltage of said second transformer and said fraction of said output voltage of said fourth transformer, said constant being selected so that said difference is proportional to the product of said distance and the sine of said angle.

11. An apparatus for computing the height of a distant object comprising a source of alternating current, a plurality of transformers having adjustable outputs, one of said transformers being connected across said source and the remaining ones of said transformers being connected in cascade with said one transformer, means for varying the output voltage of said one transformer in accordance with the range of said object, means for varying the output voltages of a plurality of said remaining transformer in accordance with the angle of elevation of said object to produce voltages proportional to the product of said range and the first and third powers respectively of said angle, means including an additional transformer having connected across the output of said one transformer and having its output adjustable in accordance with said range for producing a voltage proportional to the second power of said range, and means for adding a predetermined portion of said last mentioned voltage to said sine product voltage to provide a voltage proportional to the height of said object corrected for the curvature of the earth.

GEORGE W. FYLER.

REFERENCES CITED

The following references are of record in the file of this patent:

UNITED STATES PATENTS

| Number | Name | Date |
| --- | --- | --- |
| 1,154,252 | Kennedy | Sept. 21, 1915 |
| 1,542,534 | Schneider | June 16, 1925 |
| 1,942,193 | Szilas | Jan. 2, 1933 |
| 1,986,986 | Swartwout | Jan. 8, 1935 |
| 2,080,186 | Reymond | May 11, 1937 |
| 2,198,371 | Wolferz et al. | Apr. 23, 1940 |
| 2,212,799 | Sperry | Aug. 27, 1940 |

FOREIGN PATENTS

| Number | Country | Date |
| --- | --- | --- |
| 136,180 | Great Britain | Dec. 10, 1918 |
| 164,765 | Great Britain | Oct. 31, 1919 |
| 245,034 | Great Britain | Dec. 31, 1925 |
| 458,274 | Great Britain | July 5, 1935 |

OTHER REFERENCES

Trautwine, The Civil Engineers Pocketbook, 20th edition, page 153. (Copy in Div. 33.)

Certificate of Correction

Patent No. 2,444,770.  July 6, 1948.

GEORGE W. FYLER

It is hereby certified that errors appear in the printed specification of the above numbered patent requiring correction as follows:

Column 7, line 16, for "wtih" read *with*; column 8, line 50, for "ot the" read *to the*; column 10, line 40, claim 5, after the word "voltage" strike out the comma; and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.*